(12) United States Patent
Terashima

(10) Patent No.: US 6,274,947 B1
(45) Date of Patent: Aug. 14, 2001

(54) POWER WINDOW CONTROLLER HAVING FUNCTION TO PREVENT PINCHING

(75) Inventor: Noriaki Terashima, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/314,879

(22) Filed: May 19, 1999

(30) Foreign Application Priority Data

May 20, 1998 (JP) .................................................. 10-138748

(51) Int. Cl.⁷ ........................................................ H02P 3/00
(52) U.S. Cl. ............................ 307/10.1; 49/28; 318/266; 318/282; 318/408
(58) Field of Search ............................. 307/10.1; 49/349, 49/28, 26; 318/266, 282, 468, 469, 476, 456

(56) References Cited

U.S. PATENT DOCUMENTS

| | | | |
|---|---|---|---|
| 5,404,673 | * 4/1995 | Takeda et al. | 49/349 |
| 5,530,329 | * 6/1996 | Shigematsu et al. | 318/476 |
| 5,650,698 | * 7/1997 | Ito et al. | 318/282 |
| 5,977,732 | * 11/1999 | Matsumoto | 318/456 |
| 5,983,567 | * 11/1999 | Mitsuda | 49/26 |

FOREIGN PATENT DOCUMENTS

| | | |
|---|---|---|
| 6-123188 | 5/1994 | (JP) . |
| 2553373 | 7/1997 | (JP) . |

* cited by examiner

Primary Examiner—Albert W. Paladini
(74) Attorney, Agent, or Firm—Pillsbury Winthrop LLP (57) ABSTRACT

A controller for a power window detects a pinching situation where an obstacle is pinched or sandwiched between a frame of a window and a window glass sliding upward. External disturbances such as changes of motor terminal voltage are also detected, and effects thereof on detecting the pinching situation are eliminated. The motor rotational speed variation rates (R) are calculated based on the motor speed (V) in each measuring section divided out from a closing stroke of the power window. The variation rates (R) memorized in a previous closing stroke are used to adjust a threshold value (TH) for finding the pinching situation in a following closing stroke. The motor speed variation rate (R) is compared with the adjusted threshold value (TH'), and the pinching situation is found out when the speed variation rate (R) in a deceleration direction exceeds the adjusted threshold value (TH'). When the pinching situation is found, the motor is stopped, and then the motor is driven to lower the power window.

8 Claims, 6 Drawing Sheets

POWER WINDOW CONTROLLER HAVING FUNCTION TO PREVENT PINCHING

CROSS-REFERENCE TO RELATED APPLICATION

This application is based upon and claims benefit of priority of Japanese Patent Application No. Hei-10-138748 filed on May 20, 1998, the content of which is incorporated herein by reference.

BACKGROUND OF THE INVENTION

1. Field of the Invention

The present invention relates to a control device for a power window or a sliding roof for an automotive vehicle, more particularly to such a control device that includes a function to prevent a foreign object from being pinched or sandwiched between a window frame and a sliding window glass.

2. Description of Related Art

A control device of this kind is disclosed in JP-Y2-2553373, for example. In this control device, a rotational speed variation rate of a motor that actuates a power window is calculated and stored in a memory. A predictive rotational speed is determined from the stored speed variation rate and a preceding rotational speed. If a presently detected rotational speed is lower than the predictive rotational speed, it is determined that a foreign object is pinched or sandwiched between a window frame and a sliding glass that is traveling in a direction to close the window. When such pinching is detected, the window glass is lowered to open the window.

The rotational speed of the motor, however, is affected by not only pinching but also other factors such as a terminal voltage of the motor and ambient temperature. Accordingly, the conventional control device in which detection of pinching solely depends on the predictive motor speed and the detected motor speed is not able to eliminate influence of other factors. Therefore, accuracy of the pinching detection is not sufficiently high. It may be possible to enhance the detection accuracy by storing data showing relation between the motor speed and other external factors in a microcomputer and modifying the motor speed based on the stored data. However, there is a problem that the control circuit becomes complex and a program size becomes large.

SUMMARY OF THE INVENTION

The present invention has been made in view of the above-mentioned problem, and an object of the present invention is to provide an improved controller for a power window, which is able to detect accurately a situation where a foreign object is pinched or sandwiched between a window frame and an upwardly traveling window glass, eliminating influence of other factors. Another object of the present invention is to provide such a controller that accurately detects the pinching situation without increasing a controller size and a control program size. A further object of the present invention is to provide a method of controlling the power window operation in which the pinching situation is accurately detected.

A power window is driven by an electric motor controlled by a controller including a microcomputer. A power window stroke from a fully open position to a fully closed position is divided into plural measuring sections, and the window position is detected by a limit switch or by counting pulses indicating the window position. Preferably, the measuring sections are more finely divided as the window position approaches to the fully closed position, because the pinching situation (wherein some obstacles are pinched or sandwiched between an upper frame of the window and a sliding window glass) mostly occurs at a window position close to the fully closed position. Rotational speed V of the motor is detected by counting pulses fed from the motor to the controller. When the power window is operated in the closing direction, motor speed variation rates R are calculated several times in each measuring section based on the motor speed V. Also, a threshold value TH which is inversely proportional to the motor speed V is calculated.

A highest value Gn among variation rates R in each measuring section is selected as a representing variation rate in that measuring section n. The variation rate R is set as a positive value when the motor is decelerating, while it is set as a negative value when the motor is accelerating. In selecting the highest value Gn from among the variation rates R in each measuring section, the variation rates having a negative value are precluded. The controller also includes a function to detect external disturbances such as changes of a voltage supplied to the motor. The highest value Gn in each measuring section is not memorized when such disturbances are detected to eliminate influence of such disturbances in finding the pinching situation. Also, the highest value Gn is not memorized when the power window is not successfully closed due to occurrence of the pinching situation.

The highest value Gn representing the motor speed variation in each measuring section is memorized during a previous closing operation of the power window, and the memorized value Gn is used to adjust the threshold value TH during a following closing operation of the power window. That is, an adjusted threshold value TH'(n) in a given measuring section n is calculated according to a formula: TH'(n)=TH+Gn. The pinching situation is found out in each measuring section when the variation rate R becomes larger than the adjusted threshold value TH'(n), i.e., R>TH'(n). When the pinching situation is found, the motor is once stopped and then the power window is lowered to prevent further pinching. In addition, a maximum value Gmax among the values Gn is stored in a non-volatile memory to use it in place of the value Gn in adjusting the threshold value TH when no Gn is available in a previous window closing operation.

Thus, the pinching situation is detected without fail while eliminating the influence of the external disturbances. The function of pinching prevention is easily included in the controller without making the controller large in size and without substantially increasing a program size in the microcomputer. The motor speed variation rate R may be adjusted in lieu of the threshold value TH with the value Gn memorized in a previous window closing operation. The same results are obtained in this manner, too.

Other objects and features of the present invention will become more readily apparent from a better understanding of the preferred embodiment described below with reference to the following drawings.

DETAILED DESCRIPTION OF THE PREFERRED EMBODIMENT

Figure 1:
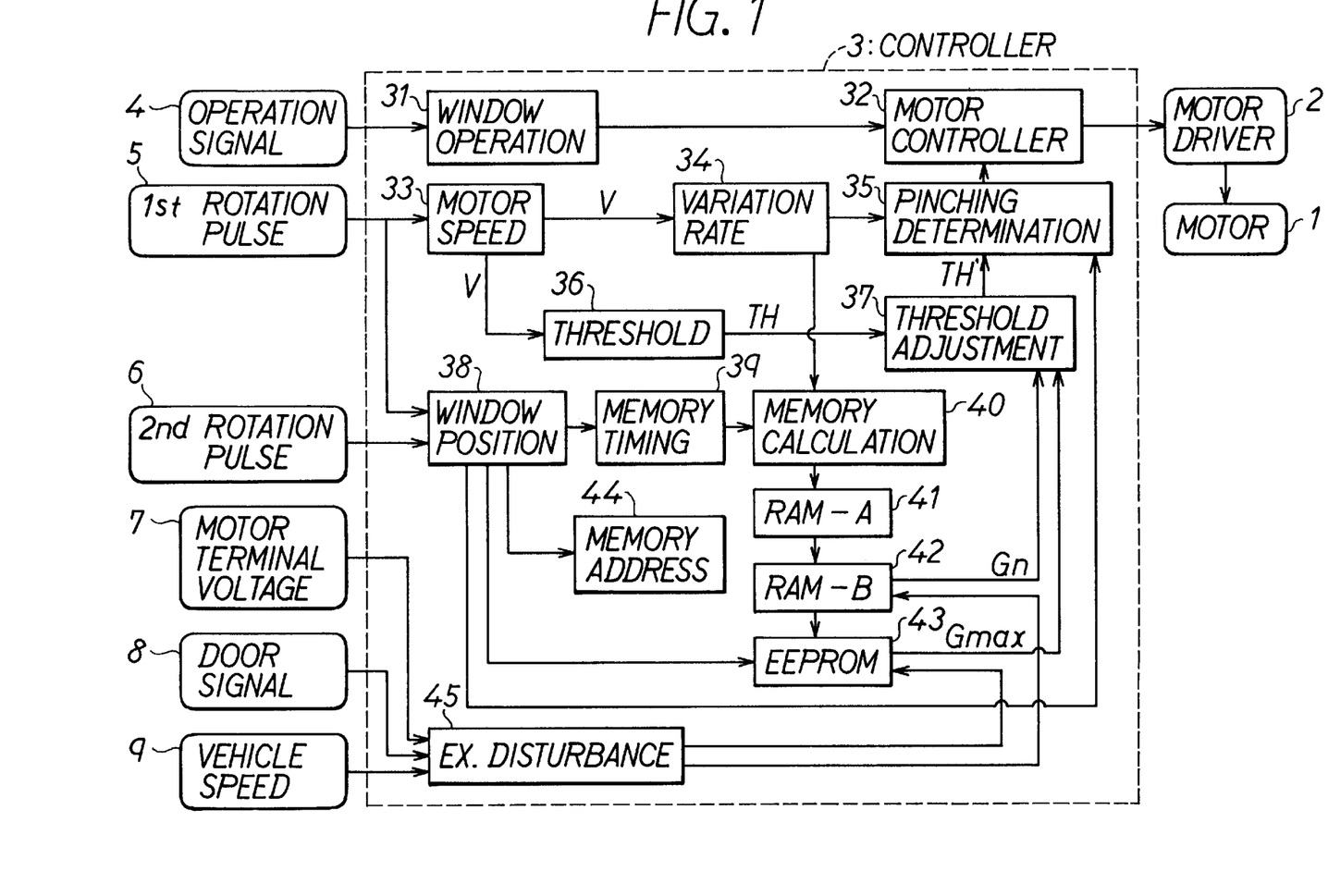
FIG. 1 is a block diagram showing a whole structure of a power window controller according to the present invention.

A preferred embodiment of the present invention will be described with reference to the drawings. FIG. 1 is a block diagram showing a structure of the power window controller which includes a function to prevent a foreign object from being pinched or sandwiched between a window frame and a window glass traveling upward. The foreign object includes part of a passenger body, such as an arm or fingers. The power window is driven by an electric motor which is controlled by the controller shown in FIG. 1. When something is about to be pinched or sandwiched by the power window during its upward or closing motion, the movement of the window is stopped and then the window is opened.

The power window system includes a motor 1 for opening and closing the window, a motor driver 2 for supplying power to the motor 1, and a controller 3 that includes a microcomputer for controlling the motor driver 2. Various signals are fed to the controller 3. The signals include: an operation signal 4 indicating the power window movement, i.e., STOP, UP and DOWN; a first rotation pulse 5 generated at every predetermined angle of motor rotation; a second rotation pulse 6 generated 90-degree apart from the first rotation pulse 5 or generated by a limit switch when the window glass reaches a vicinity of a closing position; a signal 7 indicating a motor terminal voltage; a door signal 8 indicating that a door is closed; and a vehicle speed signal 9. Since devices generating those signals, the motor 1 and the motor driver 2 are all conventional and known, only details of the controller 3 will be described below.

As shown in FIG. 1, the controller 3 is composed of: a portion 31 for receiving the window operation signal 4; a motor controller 32; a motor speed calculator 33; a motor speed variation rate calculator 34; a portion 35 for determining a pinching situation; a threshold value calculator 36; a threshold value adjuster 37; a window position calculator 38; a portion 39 for setting memory timing; a portion 40 for calculating values to be memorized; a RAM-A (a random access memory-A) 41; a RAM-B 42; an EEPROM memory 43; a portion 44 for setting memory addresses; and a portion 45 for determining external disturbance.

The portion 31 receives the window operation signal 4 and indicates opening, closing or stopping of the power window. The motor controller 32 determines power to be supplied to the motor 1 via the motor driver 2, based on signals from the portion 31 or 35. The motor controller 32 stops the motor 1 and then drives the motor 1 to lower the window when the portion 35 detects a pinching situation. The motor speed calculator 33 calculates rotational speed V of the motor 1 by counting the number of the first pulses 5 fed in a predetermined period of time. The motor speed variation rate calculator 34 calculates a motor speed variation rate R from the motor speed V. The motor speed variation rate R is calculated according to the following formula: $R=(Vb-Vp)/Vp$, where Vp is a motor speed detected at present, and Vb is a motor speed detected at a time preceding the present measurement by a predetermined short period of time. As understood from the formula, R is a positive value if the motor speed V is decreasing, while R is a negative value if the motor speed V is increasing.

The portion 35 detects the pinching situation by comparing the speed variation rate R with an adjusted threshold value TH' (described later) when the window is moving upward in a predetermined region of the window position. That is, pinching is detected when the speed variation rate R is larger than the adjusted threshold value TH', i.e., R>TH'. In other words, if the motor speed V is decreasing with a rate higher than a threshold level, then it is determined that there exists a pinching situation. The speed variation rate R is calculated according to the formula, $R=(Vb-Vp)/Vp$, as mentioned above. If some external disturbance is included in the motor speed V, it is most probable that a similar disturbance is included in both Vb and Vp. Therefore, influence of such external disturbance is not high, as long as an amount of the disturbance changes rapidly. However, in case the disturbance included in Vb and Vp is much different, such disturbance has to be eliminated in a manner described later.

The threshold value calculator 36 calculates the threshold value TH based on the motor speed V according to the following formula: TH α 1/V. The threshold value TH is set lower as the motor speed becomes higher, so that pinching is detected earlier at a higher speed, because it takes a longer time to stop the motor due to its inertia force. The window position calculator 38 determines a present window position based on the first rotation pulse 5 and second rotation pulse 6. More particularly, a window position counter P0 is reset to zero when the window reaches a fully closed position (an uppermost position) and incremented as the window moves downward. On the other hand, the window position counter P0 is decremented when the window moves upward. When the limit switch is used for generating the second rotation pulse 6, the window position counter P0 is reset to zero at a time the limit switch is turned on. Up or down movement of the window is judged from a direction of current supplied to the motor.

Figure 2:
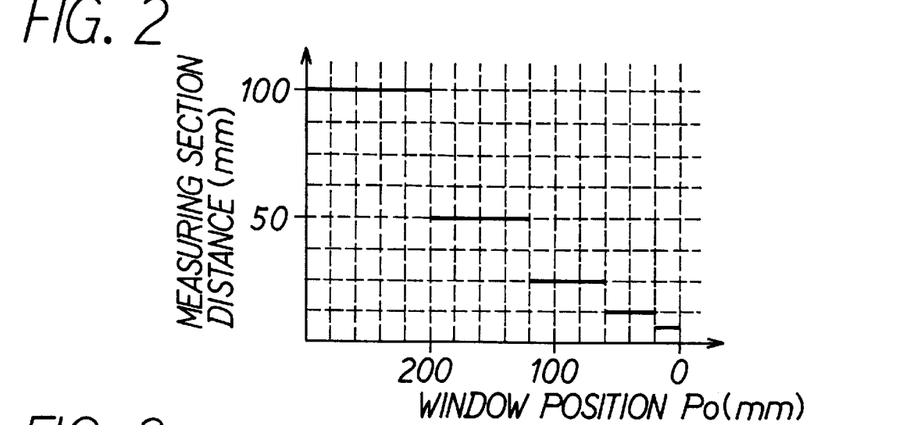
FIG. 2 is a graph showing a measuring section distance in terms of a traveling distance of a window glass.

The portion 45 detects changes of the motor terminal voltage, a door position and a vehicle speed based on the respective signals 7, 8 and 9 fed to the portion 45. The portion 39 sets timing for memorizing the data in the RAM-A. In this embodiment, a total traveling distance of the window (a distance from the fully closed position to the fully open position) is divided into plural measuring sections, and the data representing each measuring section are memorized in the RAM-A. The distance of each measuring section varies from several millimeters to several centimeters according to the window position, as shown in FIG. 2. The measuring section distance at a vicinity of the fully closed position (P0=0) is the shortest, and it becomes gradually longer. At the fully closed position, the measuring section distance is set at the longest. This is because it is necessary to detect the traveling speed of the window more frequently as the window approaches the fully closed position to surely avoid the pinching situation.

The portion 40 calculates values to be memorized in the RAM-A based on the speed variation rate R fed from the motor speed variation rate calculator 34. That is, the portion 40 selects the highest variation rate among plural variation rates R fed in each measuring section. The highest variation rate in a given section "n" is denoted as Gn. If any one of the variation rate R is negative in a given measuring section (that is, the motor speed is increasing), such a negative R is regarded as zero. This means that the largest deceleration rate in the measuring section "n" is selected as Gn representing the speed variation rate in that measuring section. It is avoided that the pinching detection becomes too sensitive to be affected by the external disturbance by neglecting the negative R in selecting Gn.

Figure 3:
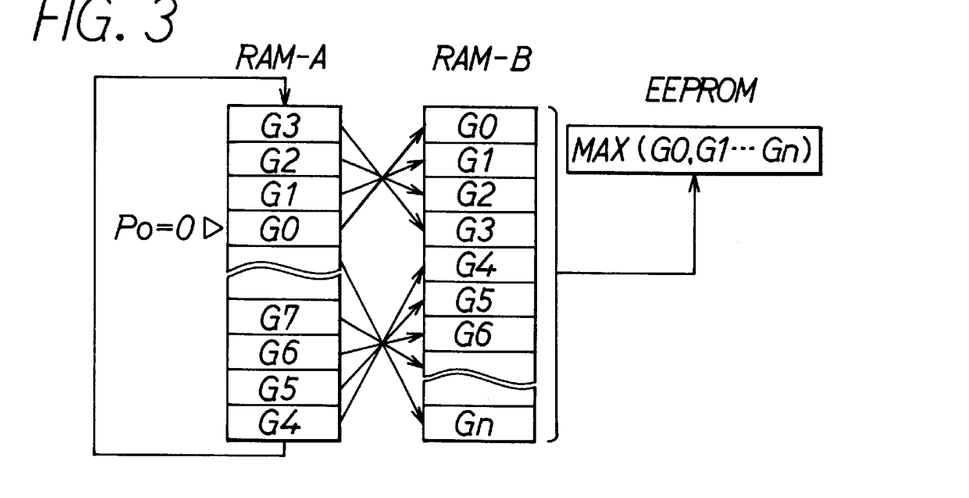
FIG. 3 is a diagram showing memory addresses where data representing rotational speed variation rates are memorized or stored.

The highest speed variation rate Gn for each measuring section is memorized in the RAM-A 41 as FIFO format data, as shown in FIG. 3. At least several highest variation rates Gn at a vicinity of the fully closed window position are memorized in this manner, even if a memory capacity is not sufficiently large. The portion 44 sets addresses in the RAM-B 42. Each Gn is stored in the address corresponding to the window position, as shown in FIG. 3, when the window reaches the fully closed position. If the window could not be fully closed, the Gn data are not stored in the RAM-B. That is, G0, G1, G2 . . . Gn are stored in this order, beginning with the address corresponding to the fully closed window position (P0=0). To eliminate influence of the external disturbance, Gn is not stored if a signal indicating an external disturbance is fed to RAM-B from the disturbance determining portion 45.

The highest Gmax is selected among Gn stored in the RAM-B when there is no external disturbance and is written in the EEPROM memory 43. The written Gmax serves to adjust the threshold value TH when no Gn is available at a time such as when the power source is newly connected to the motor. Gn stored in the RAM-B and Gmax written in the EEPROM are replaced with new data every time the window is fully closed and fed to the threshold value adjuster 37.

The threshold value adjuster 37 adjusts the threshold value TH with Gn when there is no external disturbance and with Gmax when there is external disturbance. That is, the adjusted threshold value TH'(n) for each measuring section is calculated according to the following formula: TH'(n)= TH+Gn (or Gmax) In other words, the threshold value TH calculated based on the motor speed V is adjusted in each measuring section with Gn which is stored in the preceding power window operation where there is no external disturbance. It is possible to modify the foregoing adjusting formula into a formula: TH'(n)=TH+kGn, where k is a constant value. When the microcomputer is reset, TH is adjusted with Gmax in place of Gn because no Gn is stored. When the microcomputer is operated first time, TH is adjusted with a value pre-stored in the ROM because no other data are available.

Figure 4:
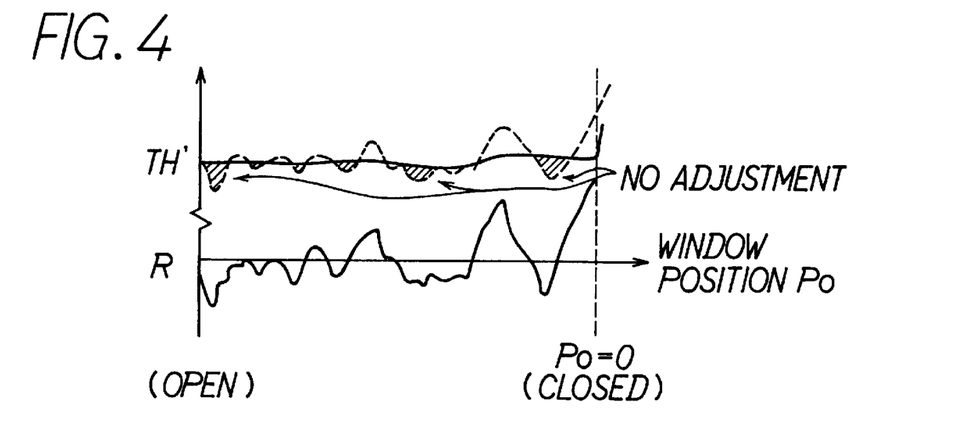
FIG. 4 is a graph showing a rotational speed variation rate of a motor and its threshold value versus a window position.
Figure 5:
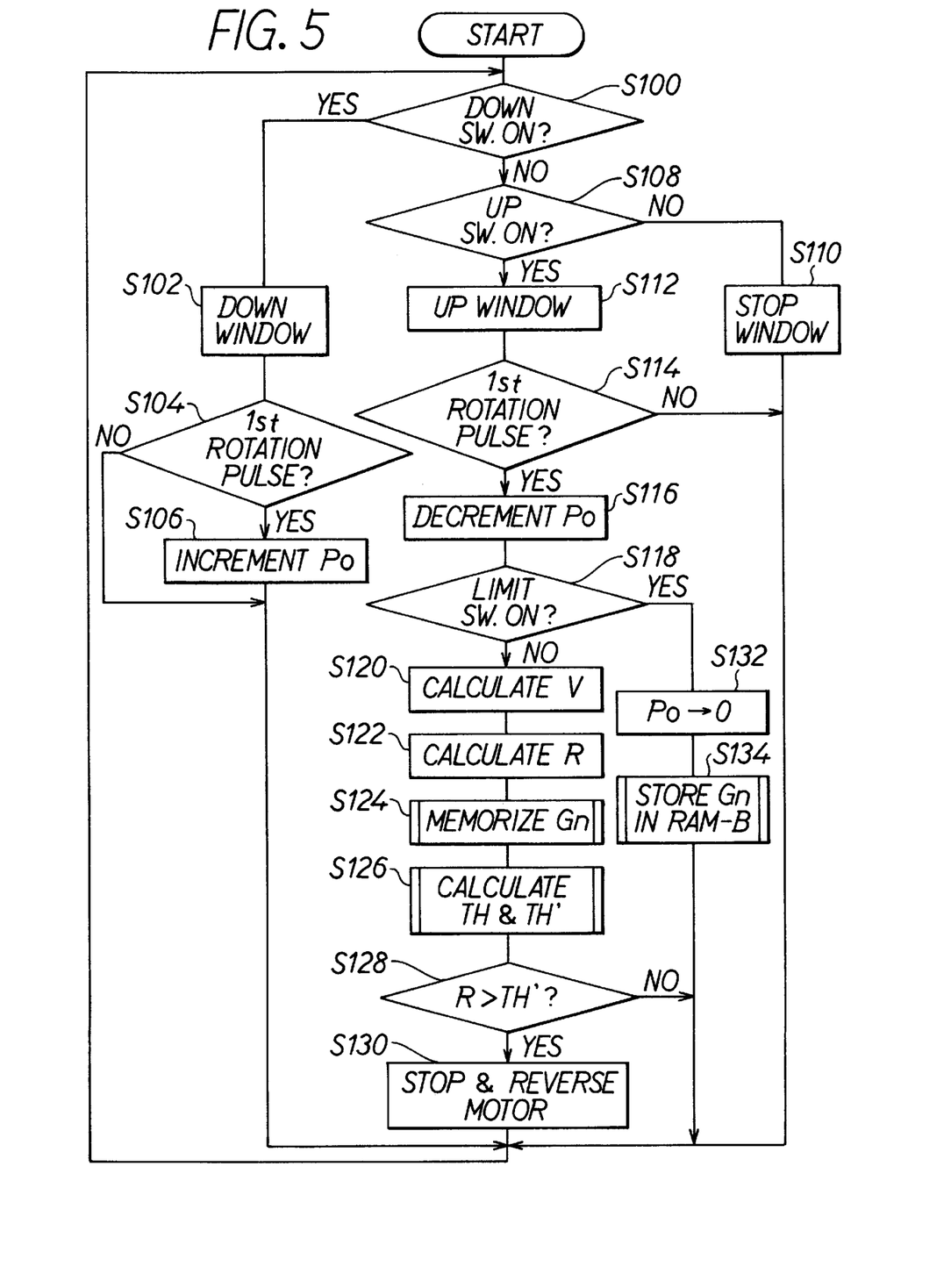
FIG. 5 is a flowchart showing a main routine of a power window control process.

The motor speed variation rate R calculated in a given measuring section is compared with the adjusted threshold value TH'(n) in that section, and it is determined that there is a pinching situation if R>TH'(n). Since the speed variation rate R at a present window operation is compared with the threshold value TH' which is adjusted with the highest variation rate Gn at a preceding window operation in which the window is successfully closed, the present variation rate R does not exceed TH' even if it instantaneously fluctuates in a small range. An exemplary graph showing R and TH' versus the window position P0 is shown in FIG. 4. Thus, the pinching situation is properly detected while avoiding a false detection. Since storing Gn in the RAM-B is prohibited when the external disturbance is detected, disturbance effects on the adjusted threshold value TH' are eliminated. Since Gmax stored in the EEPROM 43 is used in adjusting the threshold value when no Gn is stored, there is no need to initialize the computer when it is reset.

Referring to FIGS. 5–8, processing routines in the microcomputer will be described. First, a main routine shown in FIG. 5 will be explained. At step S100, whether a DOWN switch is ON or not (whether there is a command to open the window) is determined. If the DOWN switch is ON, the window is lowered at step S102. At step S104, whether the first rotation signal 5 is fed or not is determined. If there is the first rotation signal 5, the window position counter P0 is incremented at step S106. If there is no first rotation signal 5, the routine returns to step S100. If there is no DOWN command at step S100, whether an UP command (a command to close the window) exists or not is determined at step S108. If there is no UP command, the window operation is stopped at step S110, and the routine returns to step S100. If there is the UP command, the window is operated in the closing direction at step S112.

Figure 6:
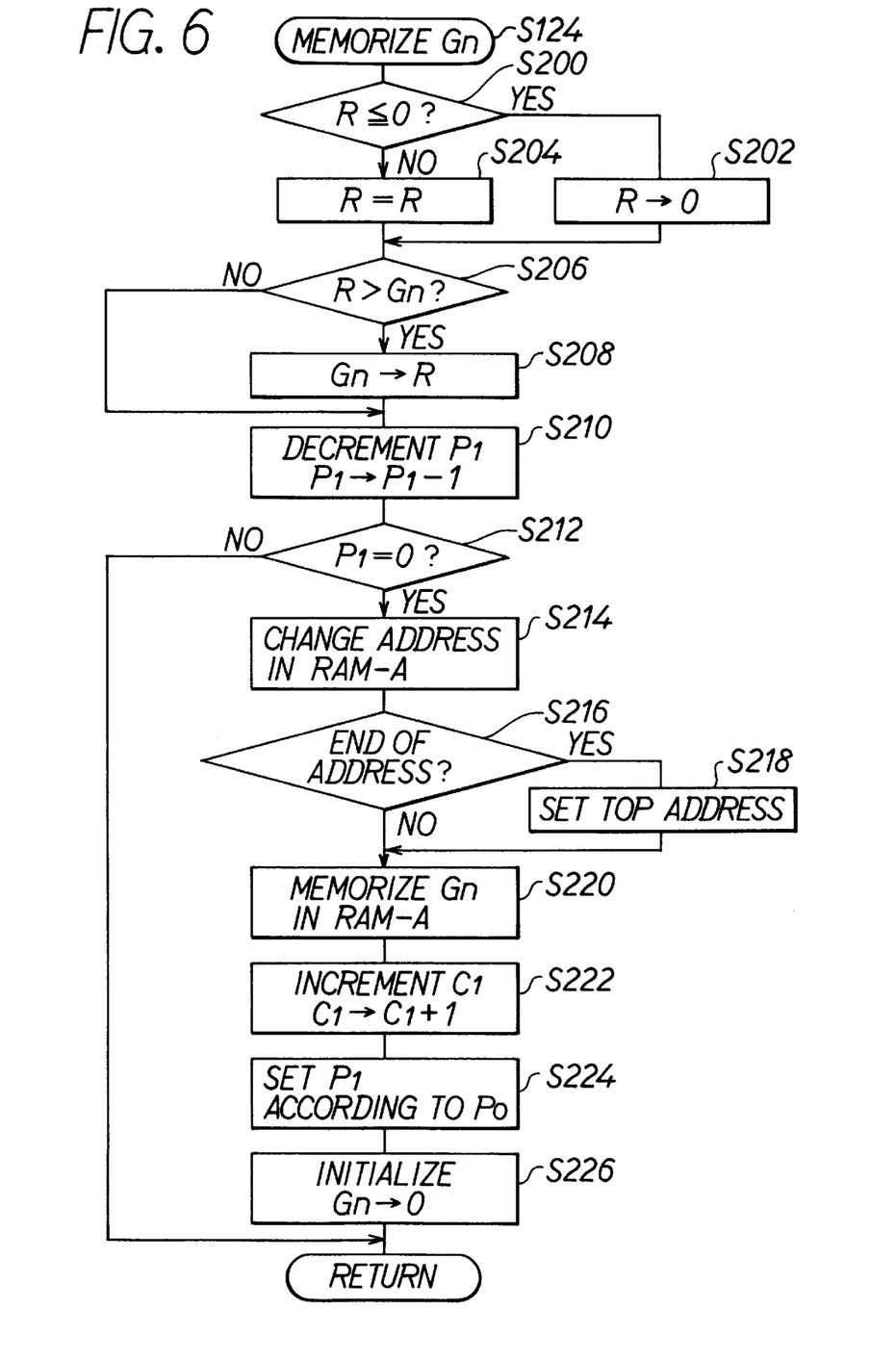
FIG. 6 is a flowchart showing a sub-routine for memorizing the rotational speed variation rate in a memory.
Figure 7:
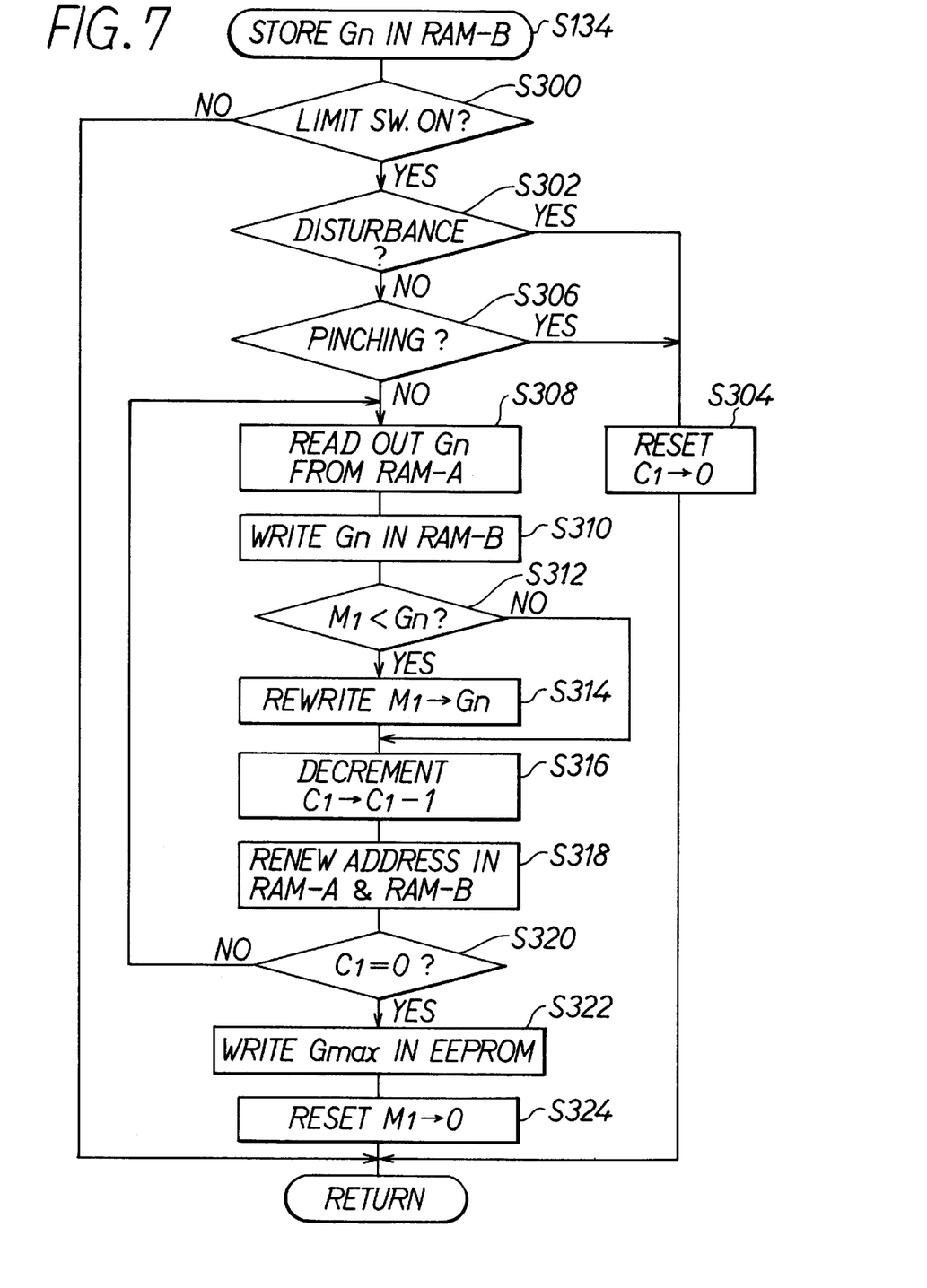
FIG. 7 is a flowchart showing a sub-routine for storing the rotational speed variation rate in a designated address of a memory.
Figure 8:
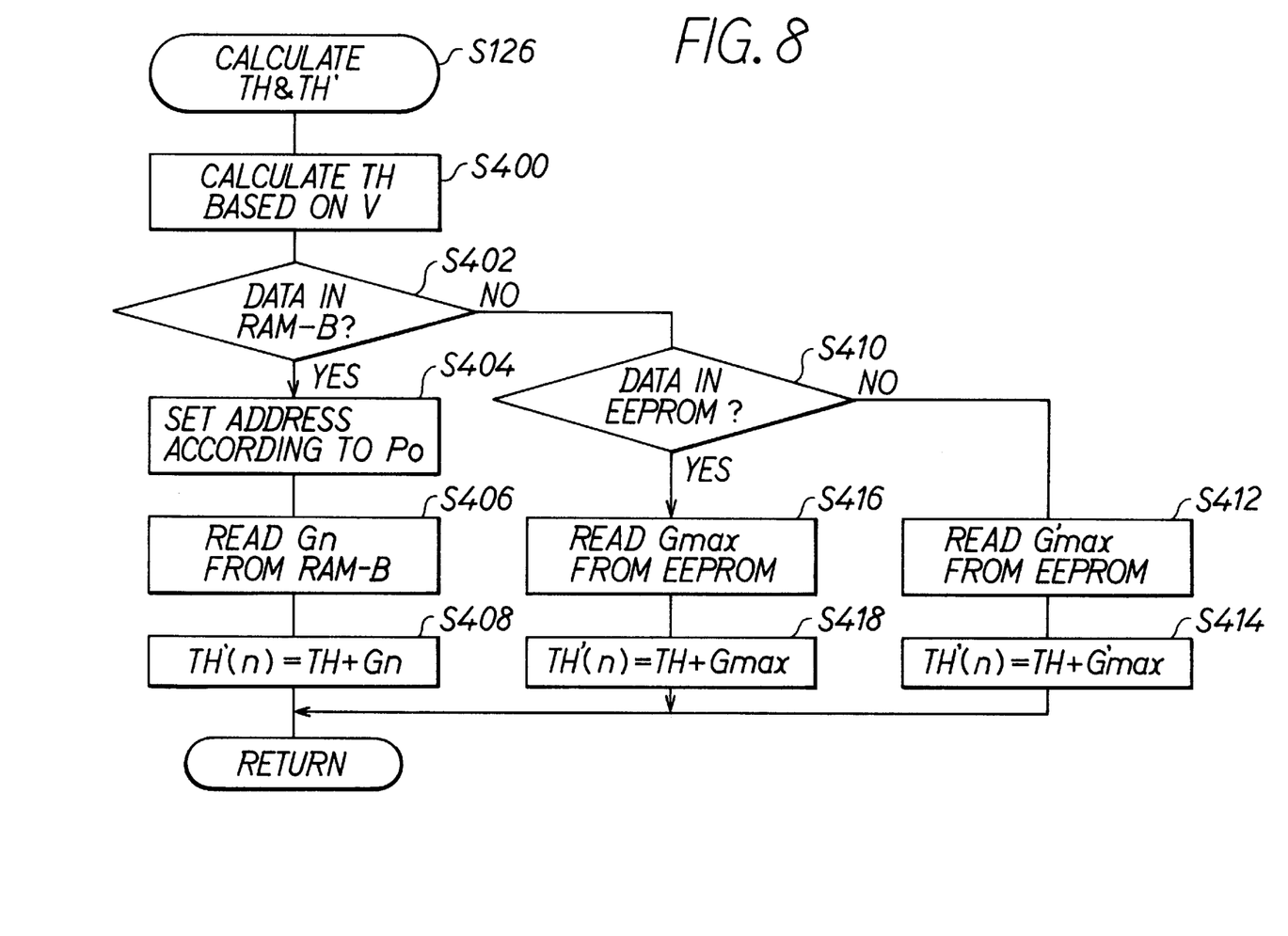
FIG. 8 is a flowchart showing a sub-routine for calculating and adjusting the threshold value of the rotational speed variation rate.

At step S114, whether the first rotation pulse 5 is fed or not is determined. If there is the first rotation pulse, the window position counter P0 is decremented at step S116, and then whether the limit switch is turned ON or not is determined at step S118. If the limit switch is not turned ON, the motor rotational speed V is calculated based on the frequency of the first pulse at step S120. Then, the speed variation rate R is calculated based on the motor speed V at step S122. Then, the variation rate R is memorized in the RAM-A through a sub-routine S124 (details are shown in FIG. 6). Then, the threshold value TH and the adjusted threshold value TH' are calculated through a sub-routine S126 (details are shown in FIG. 8). Then, the variation rate R is compared with the adjusted threshold value TH' at step S128. If R≦TH', the routine returns to S100. If R>TH', it is determined that pinching occurred, and the operation of the window is stopped and the window is lowered by a predetermined distance at step S130. Then, the routine returns to step S100. On the other hand, if it is determined that the limit switch in ON at step S118, the window position counter P0 is reset to zero at step S132, and then Gn for each measuring section is stored in the RAM-B through a sub-routine S134 (details are shown in FIG. 7). Then, the routine returns to S100, and repeats the same process.

Referring to FIG. 6, the sub-routine 124 for memorizing Gn will be explained. At step S200, whether the variation rate R calculated at step S122 is negative (R≦0) or positive (R>0) is determined. If R is negative, i.e., the motor speed is increasing, the variation rate R is set to zero (0) at step S202, and if R is positive, i.e., the motor speed is decreasing, the original R is used as R at step S204. At step S206, whether R is larger than Gn previously memorized or not is determined. If R is larger than the previous Gn, the previous Gn is renewed to a new Gn that is equal to R at step S208. If R is not larger than the previous Gn, the previous Gn is kept as it was. Then, a pulse counter P1 (explained later) is decremented at step S210. At step S212, whether the pulse counter P1 is zero or not is determined. If P1 is not zero, i.e., if measuring in a present measuring section is not completed, the sub-routine returns to the main routine. If P1 is zero, i.e., if measuring in the present measuring section is completed, the address of the RAM-A is renewed by one address at step S214. At step S216, whether the address in the RAM-A comes to the last address or not is determined. If the address is not the last one, the sub-routine moves to step S220. If the address is the last one, the address is renewed to the first address at step S218. Then, Gn is memorized in the designated address of the RAM-A at step S220. Then, a counter C1 indicating the number of memorized data (Gn) is incremented to select the next measuring section at step S222. Then, an initial count corresponding to the selected next measuring section is set in the pulse counter P1 at step S224. Then, Gn is reset to zero at step S226, and the sub-routine returns to the main routine.

Now, the function of the pulse counter P1 will be described. The pulse counter P1 is a counter to indicate the number of calculation and judgement of the speed variation rate R in each measuring section. A predetermined initial count is set in the pulse counter P1 at the beginning of every measuring section. The count in the pulse counter P1 is decreased in accordance with the upward movement of the window, i.e., according to the count of the window position counter P0. The pulse counter P1 is decremented every time the first rotation pulse 5 is fed, corresponding to the upward movement of the window at step S112 and the determination at step S114.

Referring to FIG. 7, the sub-routine S134 will be described. This sub-routine starts after the window position counter P0 is reset to zero at step S132 in FIG. 5. At step S300, whether the limit switch is ON or not is determined. If the limit switch is not ON, the sub-routine returns to the main routine. If the limit switch is ON, whether there is external disturbance during the present upward movement of the window is determined at step S302. If there is the disturbance, the counter C1 is reset to zero at step S304, and the sub-routine returns to the main routine. If there is no disturbance, whether there is a reverse movement of the window due to detection of pinching or not is determined at step S306. If there is the reverse movement, the counter C1 is reset to zero at step S304, and the sub-routine returns to the main routine. That is, if the external disturbance or the pinching is found during the present upward movement of the window, C1 is set to zero and no data is memorized. If no pinching is found at step S306, Gn corresponding to the present measuring section is read out from the RAM-A at step S308, and the read out Gn is stored in the RAM-B at an address corresponding to C1 at step S310.

At step S312, whether the present Gn is larger than M1 (a previously stored Gn) or not is determined. If the present Gn is larger than M1, M1 is renewed to Gn at step S314. If not, M1 is kept as it was. The counter C1 is decremented at step S316, and then the address of the RAM-A and RAM-B is renewed for processing Gn in the next measuring section at step S318. Steps S308 to S318 are repeated until the counter C1 becomes zero. That is, the same process is repeated until all the Gn for every measuring section are stored. At step S320, whether the counter C1 is zero or not is determined. After the counter C1 reaches zero, Gmax that is the maximum among all the Gn is written in the EEPROM 43 at step S322. The previously stored M1 is reset to zero at step S324, and the sub-routine returns to the main routine.

Referring to FIG. 8, the sub-routine S126 for calculating the threshold value TH and the adjusted threshold value TH' will be described. At step S400, the threshold value TH that is proportional to 1/V (V is the motor speed) is calculated from a map pre-installed in the microcomputer. At step S402, whether the speed variation rate Gn is stored in the RAM-B 42 is determined. If Gn is stored in the RAM-B, the address in the RAM-B corresponding to the present measuring section is designated at step S404. Then, Gn is read out from the designated address at step S406. At step S408, the adjusted threshold value TH'(n) is calculated according to the formula: TH'(n)=TH+Gn, and the sub-routine returns to the main routine. If it is determined that there is no Gn data at step S402, whether the maximum variation rate Gmax is written in the EEPROM 43 or not is determined at step S410. If no Gmax is written in the EEPROM 43, G'max preset in the ROM is read out at step S412. At step S414, the adjusted threshold value TH'(n) is calculated according to the formula: TH'(n)=TH+G'max, and the sub-routine returns to the main routine. If the Gmax is found in the EEPROM 43 at step S410, Gmax is read out at step S416. Then, the adjusted threshold value TH'(n) is calculated according to the formula: TH'(n)=TH+Gmax at step S418, and the sub-routine returns to the main routine.

Though the pinching situation is determined by comparing the motor speed variation rate R with the adjusted threshold value TH'(n) in the embodiment described above, it is also possible to adjust the variation rate R with Gn and to compare the adjusted R with the original TH. That is, the pinching situation may be similarly found out according to a formula, (R−Gn)>TH, in place of the formula R>(TH+Gn).

While the present invention has been shown and described with reference to the foregoing preferred embodiment, it will be apparent to those skilled in the art that changes in form and detail may be made therein without departing from the scope of the invention as defined in the appended claims.

What is claimed is:

1. A power window controller comprising:
   means for detecting a rotational speed of a motor that drives a power window;
   means for detecting a variation rate of the rotational speed of the motor when the motor drives the power window in a closing direction;
   means for determining a threshold value of the variation rate;
   means for detecting a position of the power window;
   means for adjusting the threshold value, based on the variation rate and the window position, to obtain an adjusted threshold value;
   means for determining that a pinching situation exists if the variation rate is larger than the adjusted threshold value; and
   means for opening the power window when the pinching situation exists.

2. The power window controller as in claim 1, wherein:
   the means for detecting a position detects a whole traveling distance from a fully open position to a fully closed position of the power window is divided into a plurality of measuring sections;
   the means for adjusting the threshold value memorizes a highest value selected from among a plurality of the variation rates in each measuring section during a previous power window operation in which the power window is successfully closed, and adjusts the threshold value in each measuring section based on the memorized highest value.

3. The power window controller as in claim 2, wherein each distance of the plurality of measuring sections becomes gradually shorter as the power window moves closer to the fully closed position.

4. The power window controller as in claim 2, further including means for detecting external disturbance, wherein:
   the means for adjusting the threshold value prohibits memorizing the highest value obtained during a power window operation in which the external disturbance is detected.

5. The power window controller as in claim 2, wherein:
   the means for adjusting the threshold value selects a maximum variation rate from among the highest value in the plurality of the measuring sections, and stores the maximum variation rate in an non-volatile memory, and adjusts the threshold value based on the stored maximum variation rate when the highest value is not available.

6. The power window controller as in claim 2, wherein the variation rates indicating acceleration of the motor speed are precluded from the plurality of the variation rates in selecting the highest value.

7. A method of controlling a power window comprising:

detecting rotational speed of a motor that drives the power window;

calculating a motor speed variation rate, based on the rotational speed, during a closing movement of the power window;

calculating a threshold value that is inversely proportional to the variation rate;

detecting a power window position;

adjusting the threshold value into an adjusted threshold value based on the window position and the variation rate detected during a previous closing movement of the power window;

finding a pinching situation when the variation rate is larger than the adjusted threshold value; and opening the power window when the pinching situation is found.

8. The method of controlling a power window as in claim 7, wherein the adjusting step includes:

dividing the closing movement of the power window from a fully open position to a fully closed position into a plurality of measuring sections;

memorizing a highest value among the variation rates in each measuring section; and adjusting the threshold value in each measuring section into the adjusted threshold value by adding the memorized highest value to the threshold value.

* * * * *